US008973925B1

(12) United States Patent
Helterbrand

(10) Patent No.: US 8,973,925 B1
(45) Date of Patent: Mar. 10, 2015

(54) FOLDING CONVERTIBLE WHEELCHAIR

(71) Applicant: Arlen Helterbrand, Sheridan, IN (US)

(72) Inventor: Arlen Helterbrand, Sheridan, IN (US)

( * ) Notice: Subject to any disclaimer, the term of this patent is extended or adjusted under 35 U.S.C. 154(b) by 0 days.

(21) Appl. No.: 14/531,658

(22) Filed: Nov. 3, 2014

Related U.S. Application Data

(63) Continuation-in-part of application No. 13/946,620, filed on Jul. 19, 2013, now abandoned.

(51) Int. Cl.
*B60N 2/28* (2006.01)
*A61G 5/08* (2006.01)
*A61G 5/12* (2006.01)
*A61G 5/10* (2006.01)

(52) U.S. Cl.
CPC .. *A61G 5/08* (2013.01); *A61G 5/12* (2013.01); *A61G 5/1018* (2013.01); *A61G 2005/0825* (2013.01); *A61G 2005/128* (2013.01)
USPC ......................................... 280/30; 280/250.1

(58) Field of Classification Search
CPC ............ A61G 5/00; A61G 2005/1054; A61G 2005/128; A61G 5/06; A61G 2005/1089
USPC ............ 280/30, 7.1, 7.15, 47.34, 47.38, 47.4, 280/200, 242.1, 250.1, 278, 287, 288.4, 280/293, 295, 296, 304.1, 415.1, 642, 643, 280/647, 648, 650, 654; 297/16.1, DIG. 4
See application file for complete search history.

(56) References Cited

U.S. PATENT DOCUMENTS

| | | | | |
|---|---|---|---|---|
| 4,676,519 A * | 6/1987 | Meier | | 280/250.1 |
| 4,892,323 A * | 1/1990 | Oxford | | 280/250.1 |
| 5,149,118 A * | 9/1992 | Oxford | | 280/250.1 |
| 5,427,398 A * | 6/1995 | Weybrecht | | 280/304.1 |
| 5,634,650 A * | 6/1997 | Hensler et al. | | 280/47.38 |
| 6,443,268 B1 * | 9/2002 | Dearth et al. | | 188/2 F |
| 7,845,654 B2 * | 12/2010 | Price, Jr. | | 280/47.34 |
| 8,191,913 B1 * | 6/2012 | Jessome | | 280/304.1 |
| 8,414,008 B2 * | 4/2013 | Hay | | 280/304.1 |
| 8,678,402 B2 * | 3/2014 | Helterbrand | | 280/30 |
| 2007/0018443 A1 * | 1/2007 | Wilmot | | 280/755 |
| 2008/0246251 A1 * | 10/2008 | Fast et al. | | 280/304.1 |
| 2010/0109283 A1 * | 5/2010 | Wilmot et al. | | 280/304.1 |
| 2011/0101642 A1 * | 5/2011 | Chiu | | 280/304.1 |
| 2012/0169025 A1 * | 7/2012 | Golden, Jr. | | 280/250.1 |
| 2012/0169026 A1 * | 7/2012 | Golden, Jr. | | 280/250.1 |
| 2014/0035253 A1 * | 2/2014 | Helterbrand | | 280/250.1 |
| 2014/0035260 A1 * | 2/2014 | Helterbrand | | 280/650 |

* cited by examiner

*Primary Examiner* — Brodie Follman
(74) *Attorney, Agent, or Firm* — Bruce J. Bowman

(57) ABSTRACT

A folding wheelchair is easily convertible between a folding wheelchair of a first type and a folding wheelchair of a second type through the use of conversion components, some of which are mounted permanently to the wheelchair and some of which are received by the mounted conversion components. In one form, the first type is a folding beach wheelchair while the second type is a folding all-terrain or trail wheelchair. Conversion is achieved through changeable front and back wheels. For instance, the folding beach wheelchair includes right and left rear wheels having oversized, low pressure tires. Right and left front brackets are mounted to the existing frame and are configured to receive right and left wheel assemblies, having smaller, low pressure tires mounted for pivoting movement. The folding all-terrain wheels have solid, high pressure or the like tires.

6 Claims, 13 Drawing Sheets

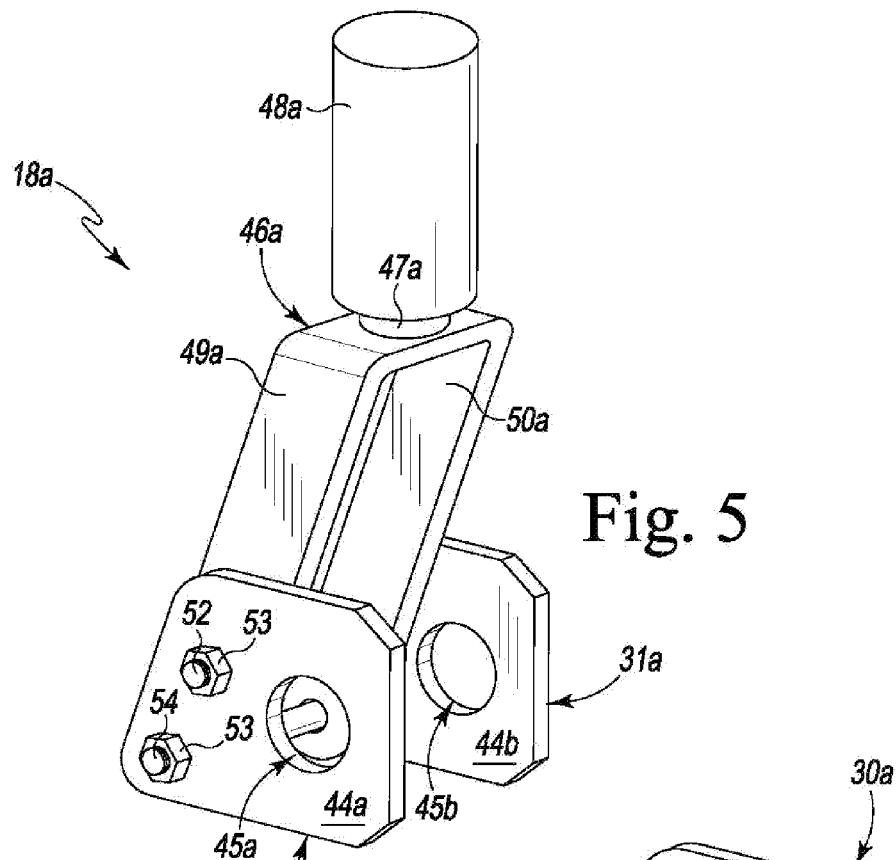
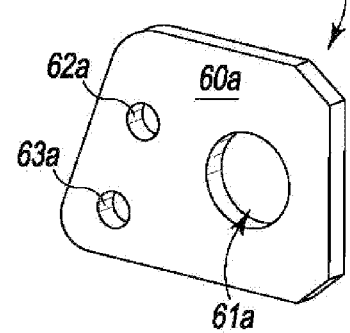
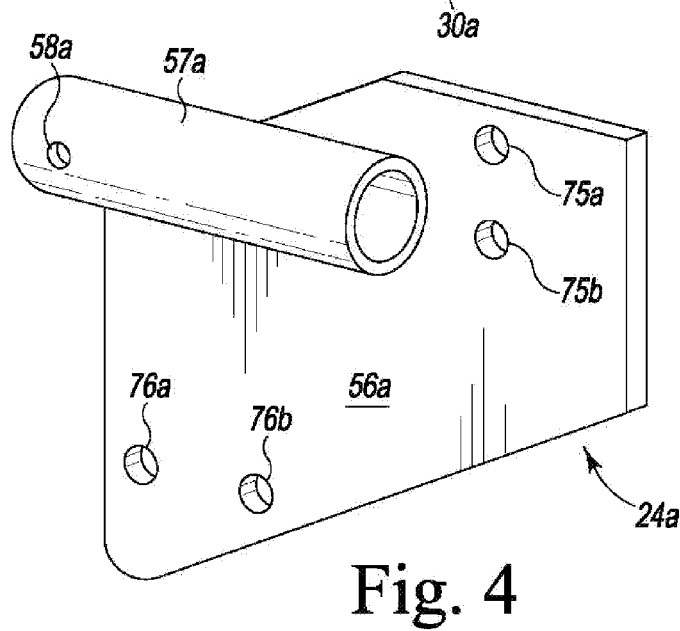
Fig. 5
Fig. 3
Fig. 4

FOLDING CONVERTIBLE WHEELCHAIR

CROSS-REFERENCE TO RELATED APPLICATIONS

This patent application is a continuation-in-part of co-pending patent application Ser. No. 13/946,620 filed Jul. 19, 2013 titled "Portable Convertible Wheelchair", which is a continuation-in-part of patent application Ser. No. 13/567,517 filed Aug. 6, 2012 titled "Portable Convertible Wheelchair" now U.S. Pat. No. 8,678,402 issued Mar. 25, 2014, the entire contents of each of which is specifically incorporated herein by this reference.

BACKGROUND OF THE INVENTION

1. Field of the Invention

The present invention relates to folding wheelchairs and, more particularly, to a folding wheelchair that is convertible between one type of folding wheelchair, such as a folding beach wheelchair, and another type of folding wheelchair, such as a folding all-terrain wheelchair.

2. Background

While there are now many types of wheelchairs, each type of wheelchair is designed with a single or dedicated purpose. For example, the typical street wheelchair one sees in hospitals, nursing homes, airports and other facilities is designed to transport a person while on relatively smooth ground, flooring, or carpet. The street wheelchair has disadvantages when used on terrain other than the typical indoor surface or conditioned outside surface—as it is difficult to push and/or navigate a street wheelchair through rough, uneven and/or sandy terrain. Many wheelchairs are pushed, guided or navigated (operated) by someone other than the person seated in the wheelchair. Therefore, the operator must then be able to control the wheelchair through the rough, uneven and/or sandy terrain.

Because people who use wheelchairs want to be able to use the same spaces others not in wheelchairs do, wheelchairs have been designed that are easier to operate on certain terrains. For instance a surface where it is difficult for a standard or street wheelchair to operate is on sandy areas/beaches. Because of their design, it is extremely difficult to push and/or navigate a typical street wheelchair on the beach. Therefore, single purpose beach wheelchairs have been developed that are easier for a person to operate than a typical street wheelchair. These single purpose beach wheelchairs however, while effective, are big and gregarious. Because of their size, they cannot be easily transported when not in use. Moreover, storage is also a problem.

Other single purpose wheelchairs have been developed for various terrains/environments. However, these single purposed wheelchairs suffer from the same disadvantages of other single purpose wheelchairs—namely, not easily transportable, storable or usable in places/terrains other than its intended places/terrains. Also, if a person wants to be able to use a wheelchair in multiple places/terrains, the user must have several single purpose wheelchairs.

In view of the above, it would therefore be advantageous to have a single wheelchair that can be used in and/or for varied terrain. Thus, there is a need for a multiple purpose wheelchair. More particularly, there is a need for a wheelchair convertible between a conventional wheelchair and a wheelchair for specialty terrains.

Also, the more portable the wheelchair, the more convenient it is to use. Folding wheelchairs provide such portability. However, folding wheelchairs are not convertible nor are there specialty wheelchairs as described herein. Therefore, it would be advantageous to have a folding wheelchair that converts between one type of folding specialty wheelchair and another type of folding specialty wheelchair. More particularly, it would be advantageous to have a folding wheelchair that converts between a folding all-terrain wheelchair and a folding beach wheelchair, and vice versa.

SUMMARY OF THE INVENTION

The present invention is a folding or foldable wheelchair that is convertible between one type of folding wheelchair and another type of folding wheelchair. The folding wheelchair includes conversion components mounted thereon that receive specialty conversion parts that convert one type of folding wheelchair into another type of folding wheelchair.

In one form, the one type of folding wheelchair is a folding beach wheelchair, while the other type of folding wheelchair is a folding all-terrain or trail wheelchair.

In a folding beach wheelchair form, the conversion components include front brackets mounted to the front wheel assemblies, rear brackets mounted to the wheelchair frame adjacent to the rear wheel assemblies, low pressure tires, and conversion support parts. The front brackets are configured to allow an axle of the conversion support parts to extend through the front wheel assemblies. An oversized, low pressure tire is mounted on each axle end. The beach conversion components further include rear brackets mounted to the frame of the wheelchair adjacent to rear wheel assemblies of the conversion support parts, each rear wheel assembly carrying a low pressure tire. The rear brackets are adapted to receive an arm of the rear wheel assembly. The configuration, type and size of the tires provide a stable wheelchair platform that is easy to push in all types of beach sands, sand terrains and/or conditions.

In another folding beach wheelchair form, the conversion components include a rear axle assembly configured for reception in existing rear axle structures for rear wheels of the street wheelchair. A rear axle of the rear axle assembly receives and carries low pressure tires. The conversion components further include front wheel assemblies configured for reception in existing front wheel supports of the street wheelchair. Each front wheel assembly carries a low pressure tire.

In another folding beach wheelchair form, the conversion components include right and left rear oversized, low pressure tires adapted for reception onto the existing rear wheelchair frame or frame and axle thereof in place of the original right and left wheelchair wheels, right and left front wheel assemblies, and right and left front brackets that are adapted to receive the right and left wheel assemblies attached to right and left front portions of the frame of the wheelchair. Once installed, the conversion components never need to be removed to provide a portable and foldable beach wheelchair. Hence, in another form of this version, the present invention is a beach wheelchair pre-configured with the conversion components as described above to provide a dedicated portable and folding beach wheelchair.

In the folding all-terrain or trail wheelchair form, the conversion components include front wheel assemblies configured for reception in existing front wheel supports of the street wheelchair. Each front wheel assembly carries an all-terrain tire. The conversion components further include rear wheel axle assemblies configured for reception in existing rear axle structures for the rear tires of the street wheelchair. The front and rear all-terrain tires are wide and have a thick tread. Moreover, the front and rear all-terrain tires are sized accordingly.

The present folding convertible wheelchair may be converted into other specialty wheelchairs through use of other conversion components and/or parts. For instance, a folding all-terrain wheelchair may be converted into a folding beach wheelchair and vice versa by having conversion components and/or parts thereon that allow changing of wheelchair components such as front and/or back wheels. In the case of changeable front and/or back wheels, various types and/or sizes of wheels provide various characteristics to the wheelchair.

Further aspects of the present invention will become apparent from consideration of the drawings and the following description of preferred embodiments of the invention. A person skilled in the art will realize that other embodiments of the invention are possible and that the details of the invention can be modified in a number of respects without departing from the inventive concept. The following drawings and description are to be regarded as illustrative in nature and not restrictive.

BRIEF DESCRIPTION OF THE DRAWINGS

The features of the invention will be better understood by reference to the accompanying drawings which illustrate presently preferred embodiments of the present invention, wherein:

FIG. 3 is an enlarged perspective view of a front wheel bracket of the beach conversion components for attachment onto the front wheel assembly of the wheelchair;

FIG. 4 is an enlarged perspective view of a rear wheel bracket of the beach conversion components for a rear wheel assembly of the beach conversion parts;

FIG. 5 is an enlarged perspective view of a front wheel assembly of the present folding convertible wheelchair with the front wheel brackets of the beach conversion components as shown in FIG. 3 mounted thereon;

Like reference numerals indicate the same or similar parts throughout the figures.

A description of the features, functions and/or configurations of the components depicted in the various figures will now be presented. It should be appreciated that not all of the features of the components of the figures are necessarily described. Some of these non-discussed features as well as discussed features are inherent from the figures. Other non-discussed features may be inherent in component geometry and/or configuration.

DETAILED DESCRIPTION OF THE INVENTION

Figure 1:
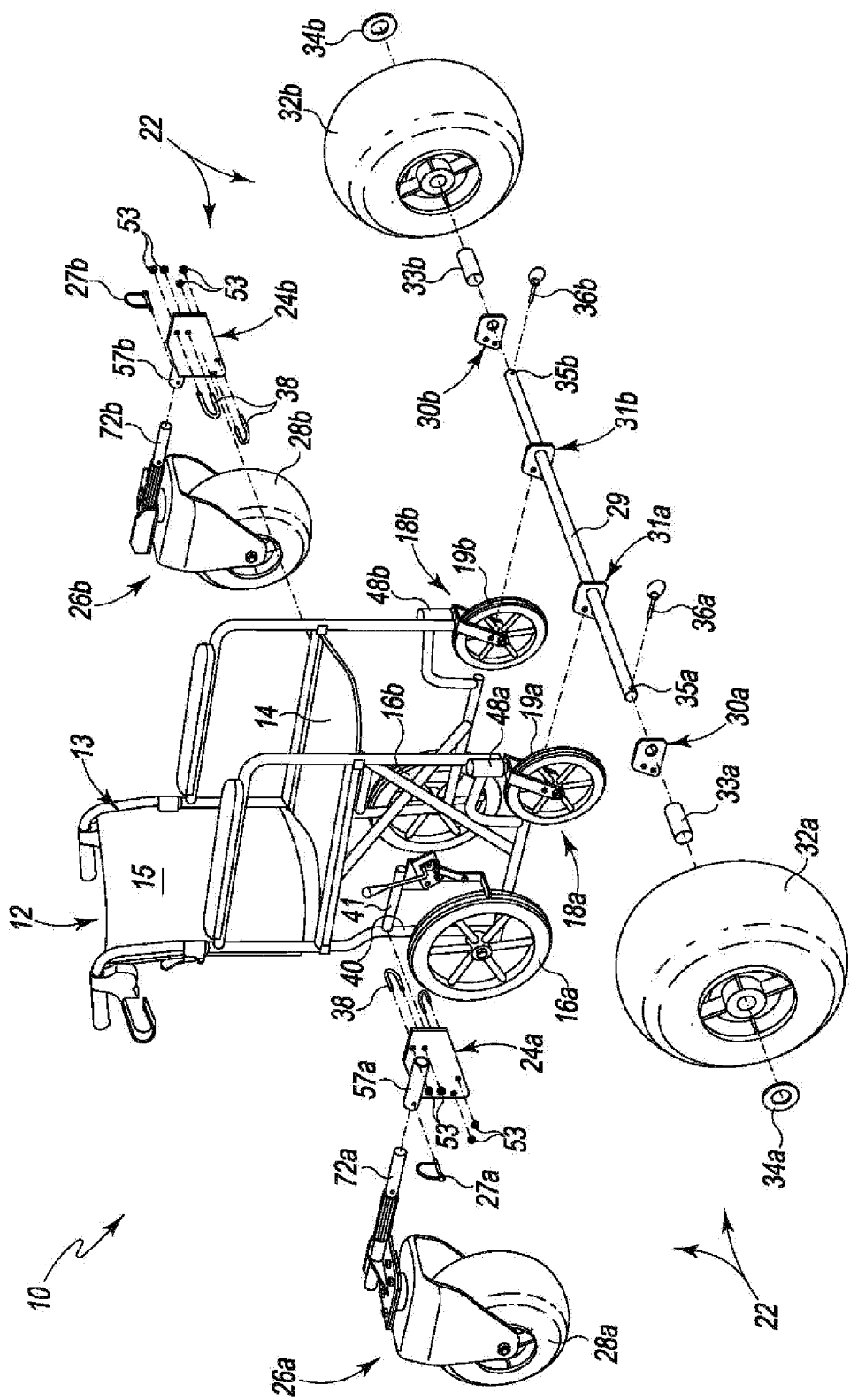
FIG. 1 is a perspective view of a folding wheelchair convertible between a folding conventional or street wheelchair and a folding specialty wheelchair, with specialty wheelchair components for converting the folding street wheelchair into a folding beach wheelchair shown in exploded view relative to the folding street wheelchair.
Figure 2:
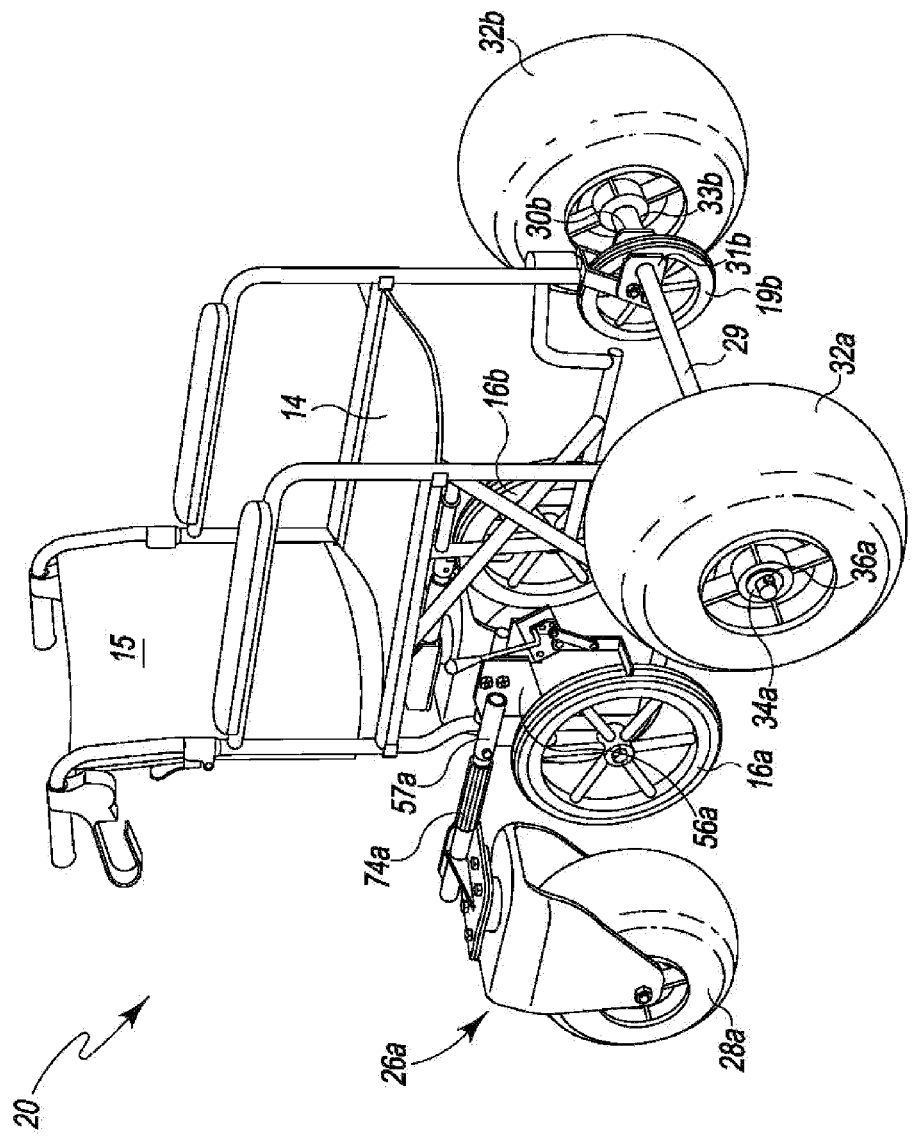
FIG. 2 is a perspective view of the folding wheelchair of FIG. 1 converted into a folding beach wheelchair via the beach conversion components.

Referring to FIGS. 1 and 2, there is shown a portable folding convertible wheelchair, generally designated 10, that is convertible between a portable folding conventional or street wheelchair 12 (see FIG. 1) and a portable folding specialty wheelchair, in accordance with the principles of the present invention. The specialty wheelchair in this case is a folding beach wheelchair 20 when specialty conversion components or parts 22 are made part of and/or installed on the wheelchair 12. The wheelchair 12 has a folding or collapsible lightweight frame 13 so as to be portable. The folding frame 13 supports a seat 14 and a back 15, brake assembly 80 (see e.g., FIG. 6), as well as armrests, user hand holds, hand brakes, and other typical wheelchair elements shown and not shown. According to the present principles, all of the wheelchairs herein are folding and portable.

The frame 13 rotatably supports a first rear wheel 16a on one side of the frame 13 and a second rear wheel 16b on another side of the frame 13. A first front wheel assembly 18a is pivotally coupled to the frame 13 at one side thereof via a first pivot boss or support structure 48a and a second front wheel assembly 18b coupled to the frame at another side thereof via a second pivot boss or support structure 48b. It should be appreciated that the nomenclature first and second (or like language) is arbitrary for both the aforementioned and below mentioned components or parts. The frame 13 is also foldable in a conventional manner.

The specialty conversion components 22 (shown in exploded view) of the convertible wheelchair 10 are particularly for conversion between the street wheelchair 12 and the beach wheelchair 20 (as shown in FIG. 2). While shown in exploded view, some of the specialty conversion components 22 are preferably, but not necessarily, pre-mounted or installed on the wheelchair 12. For instance, a first rear conversion bracket 24a is attached to frame members 40 and 41 via threaded U-bolts 38 and nuts 53 at a first rear side of the frame, while a second rear conversion bracket 24b is attached to like frame members via threaded bolts 38 and nuts 53 at a second rear side of the frame. The first and second rear conversion brackets 24a, 24b each support a rear wheel conversion assembly 26a, 26b that both support the back end of the wheelchair. Also, a first front conversion bracket pair 30a, 31a is attached to opposite sides of the first front wheel assembly 18a, while a second front conversion bracket pair 30b, 31b is attached to opposite sides of the second front wheel assembly 18b. The first and second front conversion bracket pairs are configured to support an axle 29 of the beach conversion components 22 which, in turn, supports a first front conversion tire 32a and a second front conversion tire 32b that both support the front end of the wheelchair. Other specialty conversion components 22 are temporarily installed on the wheelchair 12 when specialty conversion is desired.

As illustrated in FIG. 1, the first and second rear wheel conversion brackets 24a and 24b are mounted to the frame 13 via U-bolts 38 and nuts 53 and are configured to support the rear wheel conversion assemblies 26a, 26b. Of course, other manners of attaching the brackets may be used. As best seen in FIG. 4, the first rear wheel conversion bracket 24a is depicted in greater detail, it being understood that the second rear wheel conversion bracket 24b is the same but reversed in configuration. The rear wheel conversion bracket 24a is characterized by a plate 56a having a first pair of bores 75a, 75b that allows the legs of a U-bolt 38 to extend therethrough, and a second pair of bores 76a, 76b that allows the legs of a U-bolt 38 to extend therethrough. A tube 57a is mounted to the plate 56a and includes a bore 58a that extends through both sides of the tube 57a. The tube 57a is mounted to the plate 56a such that the opening of the tube 57a is essentially parallel to the ground.

Figure 6:
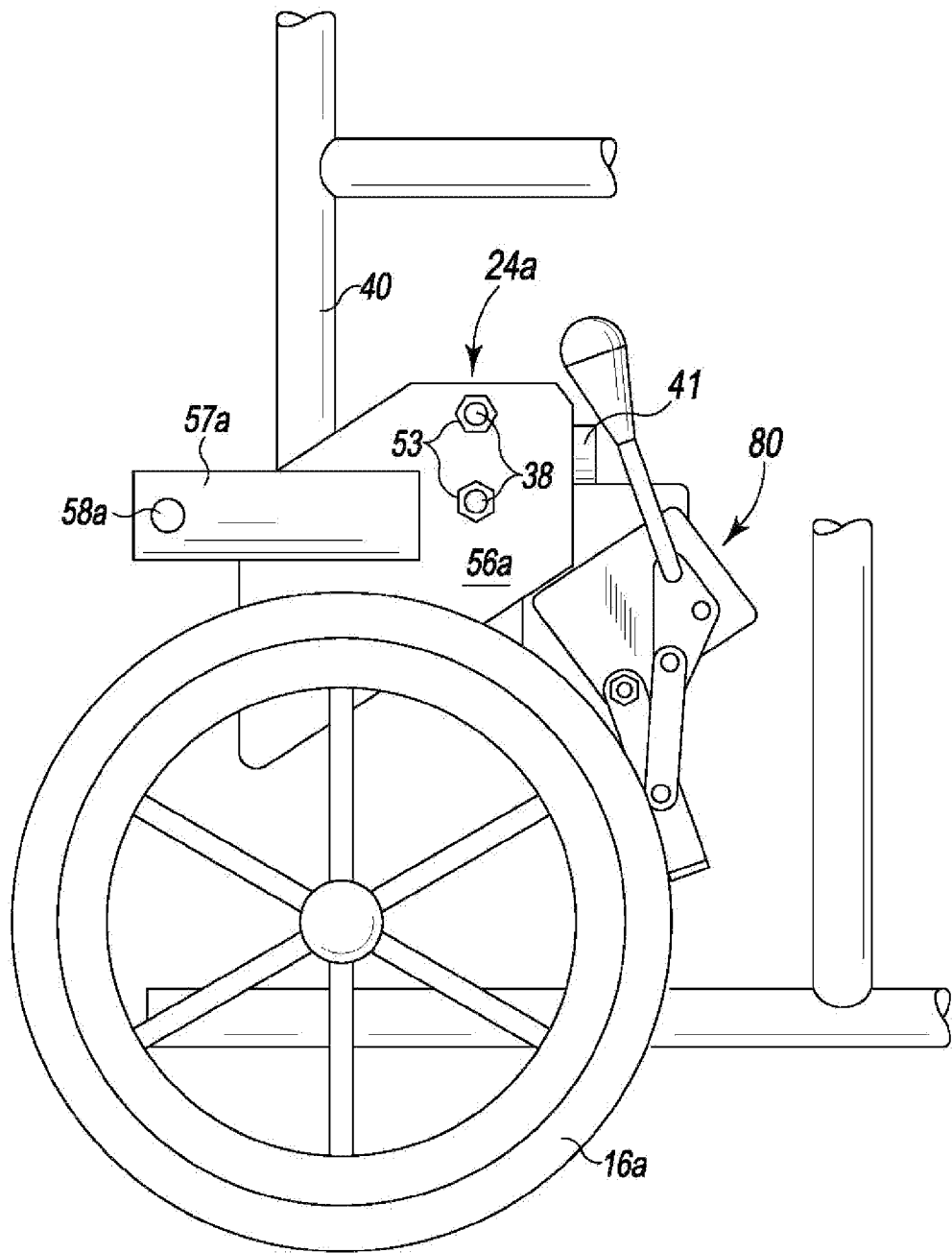
FIG. 6 is an enlarged perspective side view of a rear portion of the present folding convertible wheelchair showing placement of the rear wheel bracket of the beach conversion components as shown in FIG. 4 onto the wheelchair.
Figure 7:
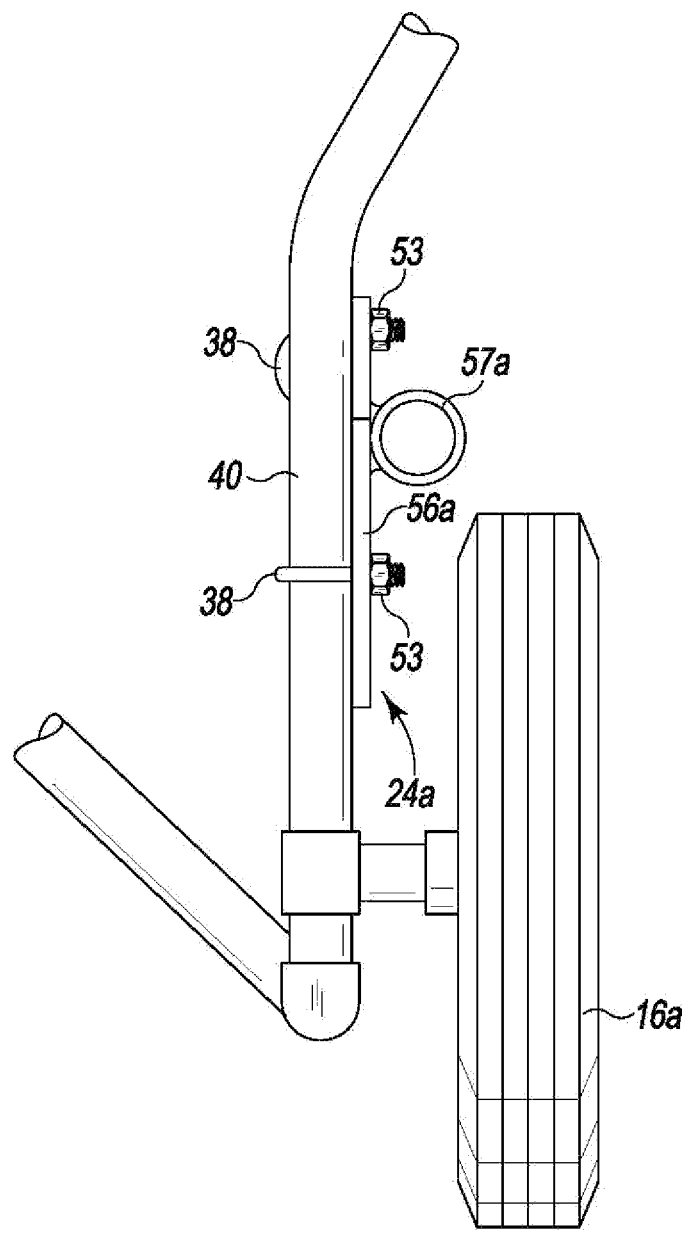
FIG. 7 is an enlarged perspective rear view of the rear portion of the present folding convertible wheelchair showing a manner of attachment of the rear wheel bracket of the beach conversion components to the wheelchair.

Referring to FIGS. 6 and 7, the first rear wheel beach conversion bracket 24a is shown mounted to the frame members 40, 41 of the frame 13 of the wheelchair 12. U-bolts 38 are shown mounting the plate 56a to the frame members 40, 41 via nuts 53. The plate 56a thereof is mounted to the frame members 40, 41 such that the tube 57a is above the first rear wheel 16a of the wheelchair 12 or otherwise oriented such that when installed, the first rear wheel conversion assembly 26a lifts the first rear wheel 16a off the ground. The tube 57a is sized to receive an arm 72a of the first rear wheel conversion assembly 26a. The arm 72a and thus the first rear wheel conversion assembly 56a is releasably held to the tube 57a via a D-pin 27a that extends through the bore 58a in the tube 57a and a bore 73a in the arm 72a of the first rear wheel conversion assembly 26a.

Figure 8:
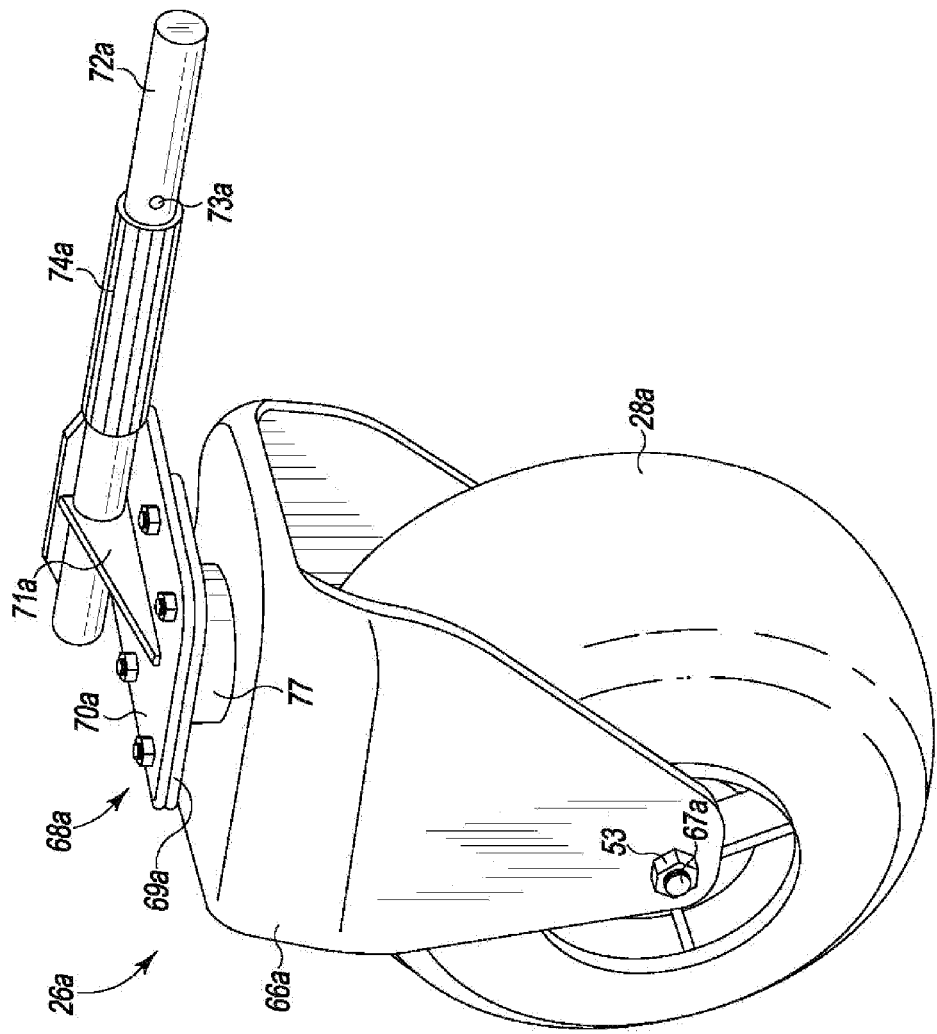
FIG. 8 is an enlarged view of a rear wheel assembly of the beach conversion components.

The first rear wheel conversion assembly 26a is depicted in greater detail in FIG. 8, it being understood that the second rear wheel conversion assembly 26b is the same. The first rear wheel conversion assembly 26a has an oversized, low pressure tire 28a mounted on an axle 67 that is supported by a yoke 66a. A stem 77 is rotatably mounted to and extends vertically from the yoke 66a to a connection assembly 68a. The yoke 66a is thus attached to the stem 77 such that the yoke 66a and thus the tire 28a can swivel or rotate about the connection assembly 68a. The stem 77 is particularly connected to a lower plate 69a of the connection assembly 68a which, in turn, is connected to an upper plate 70a of the connection assembly 68a. The upper plate 70a has a flange 71a that supports a handle 74a and arm 72a. The arm 72a has a bore 73a that aligns with the bore 58a of the tube 57a of the rear conversion bracket 24a and which receives the D-pin 27a when the arm 72a is inserted into the tube 57a. Each rear wheel conversion assembly 26 is thus easily attachable then detachable from the bracket 24. In this manner, rear beach conversion wheels are easily attached that elevate the rear wheels of the street wheelchair 12 and provide tires that allow use on all types and terrains of beaches.

As indicated above, the first front conversion bracket pair 30a, 31a is attached to the first front wheel assembly 18a, while the second front conversion bracket pair 30b, 31b is attached to the second front wheel assembly 18b in order to support the axle 29. As seen in FIG. 3, the front conversion bracket 30a is shown in greater detail and discussed below, it being understood that all of the front conversion brackets 30, 31 are the same. The front conversion bracket 30a is characterized by a plate 60a having a pair of bores 62a, 62b that allows the bolts 53 and 54 to extend therethrough, retained by nuts 53. A bore 61a is provided adjacent the bores 62a, 62b and is sized to receive the axle 29.

Referring to FIG. 5, the pair of front wheel beach conversion brackets 30a, 31a is shown attached to the yoke 46a of the first front wheel assembly 18a. Particularly, the front wheel beach conversion bracket 30a is mounted to an outside surface of a leg 49a of the yoke 46a while the front wheel beach conversion bracket 31a is mounted to an outside surface of a leg 50a of the yoke 46a. The front wheel beach conversion bracket 30a is particularly retained on the leg 49a via a bolt 52 and nut 53 associated with the upper bore 62a of the plate 60a, and a front wheel axle 54 and nut 53 associated with the lower bore 62b of the plate 60a. The axle 54 extends through and spans the front wheel beach conversion brackets 30a, 31a to hold the front tire 19a (not shown in FIG. 5). The front wheel beach conversion bracket 31a is attached to the leg 50a of the yoke 46a by a bolt and nut (not shown) extending through the appropriate bores of the plate 60a. The yoke 46a is connected to a stem 47a that is received in the pivot boss 48a.

As best illustrated in FIG. 1, the front tires 32a, 32b are situated on the axle 29 that is retained by front wheel beach conversion bracket pairs 30, 31. The axle 29 also extends through the front wheels 19a, 19b. In order to provide adequate spacing between the tire 32a and the front wheel beach conversion bracket 30a, a sleeve 33a is provided that fits over the end of the axle 29 between the tire 32a and the front wheel beach conversion bracket 30a. Likewise, in order to provide adequate spacing between the tire 32b and the front wheel beach conversion bracket 30b, a sleeve 33b is provided that fits over the end of the axle 29 between tire 32b and the front wheel beach conversion bracket 30b. A washer 34a is provided over the end of the axle 29 as it projects beyond the hub of the tire 32a. A pin 36a is received in a bore 35a in the axle proximate the end thereof, in order to retain the washer 34a and tire 32a on the axle 29. Likewise, a washer 34b is provided over the end of the axle 29 as it projects beyond the hub of the tire 32b. A pin 36b is received in a bore 35b in the axle proximate the end thereof, in order to retain the washer 34b and tire 32b on the axle 29. With the tires 32a, 32b installed on the axle 29, the front wheels 19a, 19b of the wheelchair 12 are elevated from the ground. The tires 32a, 32b allow use on all types and terrains of beaches.

Disassembly and/or conversion of the beach wheelchair 20 into the street wheelchair 12 is accomplished by removing the two rear wheel assemblies 26a, 26b, the two front tires 32a, 32b, axle 29, washers 34a, 34b and bushings 33a, 33b. For the two rear wheel assemblies 26a, 26b, a removal of the D-pins 27a, 27b from the tube 57 of the respective rear conversion plate 24 and from arm 72a, 72b of the respective rear wheel assemblies 26a, 26b, releases the respective arms that allows removal of the rear wheel assembly. For the two front tires 32a, 32b, the pins 36a, 36b are removed from the axle 29 allowing the washers 34a, 34b, the tires 32a, 32b, and the bushings 33a, 33b to be removed from the axle 29. Thereafter, the axle 29 is removed from the bracket pairs 30a, 31b and 30b, 31b.

Figure 11:
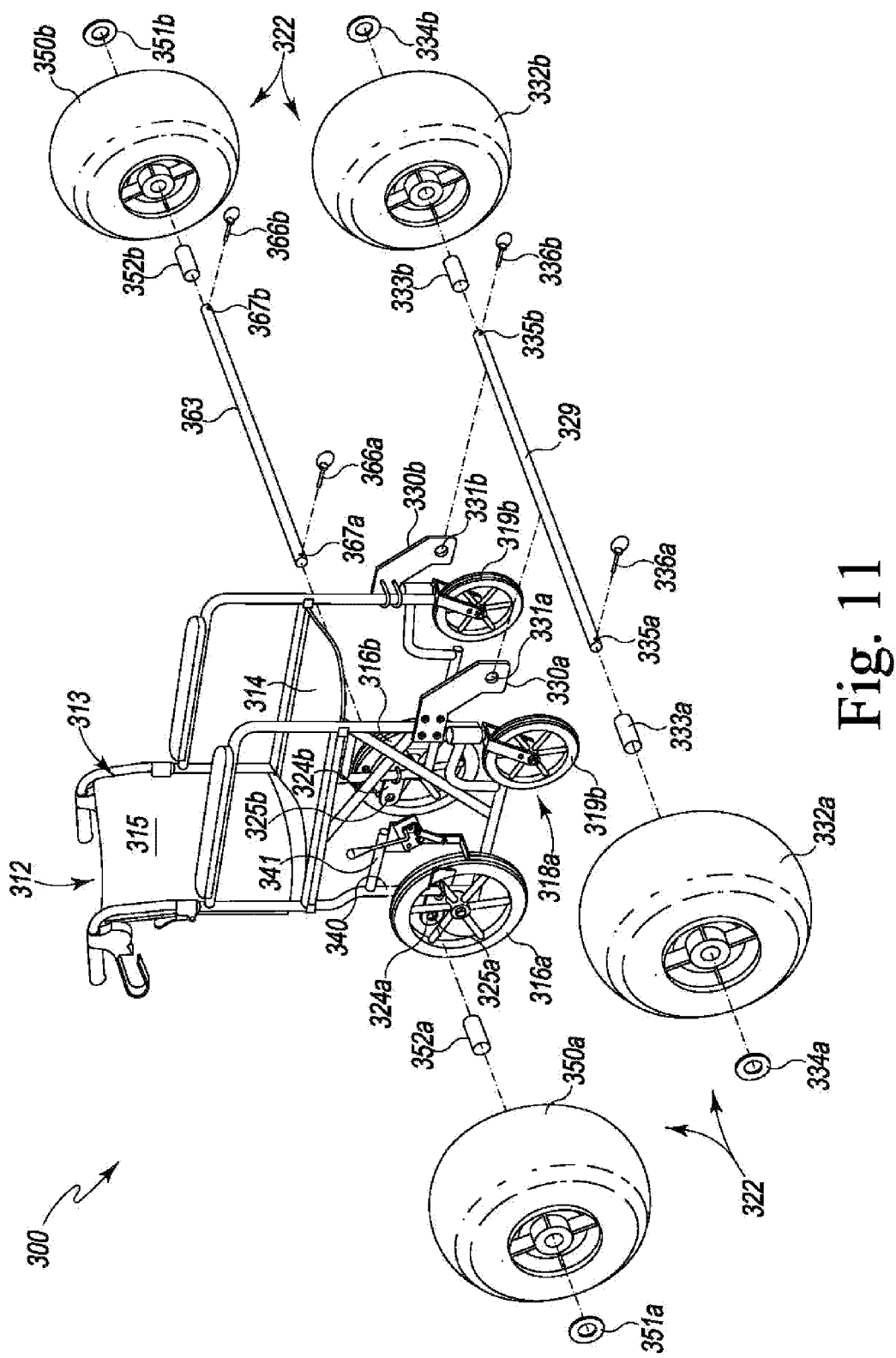
FIG. 11 is a perspective view of a folding portable wheelchair convertible between a folding conventional or street wheelchair and a folding specialty wheelchair, with specialty wheelchair components for converting the folding street wheelchair into a folding beach wheelchair shown in exploded view relative to the folding street wheelchair.

Referring now to FIG. 11, there is depicted another embodiment of a folding convertible wheelchair, generally designated 300, that is convertible between a folding conventional or street wheelchair 312 and a folding specialty wheelchair, in accordance with the present principles, wherein the folding specialty wheelchair is a folding beach wheelchair. The folding street wheelchair 312 includes at least substantially the same features and parts as the folding street wheelchair of FIGS. 1 and 2 and, as such, has corresponding parts that are numbered in the 300's whose tens and digit places correspond to the corresponding part on the wheelchair 12 of FIGS. 1 and 2. These corresponding parts will not be discussed in detail.

The folding convertible wheelchair 300 includes specialty conversion components 322 (shown in exploded view) particularly for conversion between the folding street wheelchair 312 and a folding beach wheelchair. It should be appreciated, like the wheelchair 12 of FIGS. 1 and 2, some of the specialty conversion components 322 are preferably, but not necessarily, pre-mounted or installed on the wheelchair 312. For instance, a first front conversion bracket 330a is attached to a first front frame member of the frame 313 via threaded U-bolts and nuts, while a second front conversion bracket 330b is attached to a second frame member of the frame 313 via threaded bolts and nuts. The first and second front conversion brackets 330a, 330b are thus attached to opposite sides of the front frame. The first and second front conversion brackets 330a, 330b are configured to support an axle 329 of the beach conversion components 322 which, in turn, supports a first front conversion tire 332a adjacent the first side of the frame 313 and a second front conversion tire 332b adjacent the second side of the frame 313, that both support the front end of the wheelchair 300.

When the folding convertible wheelchair is a folding beach wheelchair, a front axle 329 of the beach conversion components 322 is supported by the first and second front conversion brackets 330a, 330b. The first front conversion bracket 330a has a bore 331a, while the second front conversion bracket has a bore 331b. The bores 331a, 331b are aligned such that the front axle 329 can extend through the bores 331a, 331b. The front tires 332a, 332b are situated on the front axle 329 laterally outside the front conversion brackets 330a, 330b. In order to provide adequate spacing between the tire 332a and the first front wheel beach conversion bracket 330a, a sleeve 333a is provided that fits over the end of the front axle 329 between the tire 332a and the first front wheel beach conversion bracket 330a. Likewise, in order to provide adequate spacing between the tire 332b and the second front wheel beach conversion bracket 330b, a sleeve 333b is provided that fits over the end of the front axle 329 between the tire 332b and the second front wheel beach conversion bracket 330b. A washer 334a is provided over the end of the front axle 329 as it projects beyond the hub of the tire 332a. A pin 336a is received in a bore 335a in the front axle 329 proximate the end thereof, in order to retain the washer 334a and the tire 332a on the front axle 329. Likewise, a washer 334b is provided over the end of the front axle 329 as it projects beyond the hub of the tire 332b. A pin 336b is received in a bore 335b in the front axle 329 proximate the end thereof, in order to retain the washer 334b and the tire 332b on the front axle 329. With the tires 332a, 332b installed on the front axle 329, the front wheels 319a, 319b of the wheelchair 312 are elevated from the ground. The tires 332a, 332b allow use on all types and terrains of beaches.

Additionally, when the folding convertible wheelchair is a folding beach wheelchair, a rear axle 363 of the beach conversion components 322 is supported by the first and second rear conversion brackets 324a, 324b. The first rear conversion bracket 324a has a bore 325a, while the second rear conversion bracket has a bore 325b. The bores 325a, 325b are aligned such that the rear axle 363 can extend through the bores 324a, 324b. The rear tires 350a, 350b are situated on the rear axle 363 laterally outside the rear conversion brackets 324a, 324b. In order to provide adequate spacing between the tire 350a and the first rear wheel beach conversion bracket 324a, a sleeve 352a is provided that fits over the end of the rear axle 363 between the tire 350a and the first rear wheel beach conversion bracket 324a. Likewise, in order to provide adequate spacing between the tire 350b and the second rear wheel beach conversion bracket 324b, a sleeve 352b is provided that fits over the end of the rear axle 363 between the tire 350b and the second rear wheel beach conversion bracket 324b. A washer 351b is provided over the end of the rear axle 363 as it projects beyond the hub of the tire 350b. A pin 366a is received in a bore 367a in the rear axle 363 proximate the end thereof, in order to retain the washer 351a and the tire 350a on the rear axle 363. Likewise, a washer 351b is provided over the end of the rear axle 363 as it projects beyond the hub of the tire 350b. A pin 366b is received in a bore 367b in the rear axle 363 proximate the end thereof, in order to retain the washer 351b and the tire 350b on the rear axle 363. With the tires 350a, 350b installed on the rear axle 363, the rear wheels 316a, 316b of the wheelchair 312 are elevated from the ground. The tires 350a, 350b allow use on all types and terrains of beaches.

Figure 13:
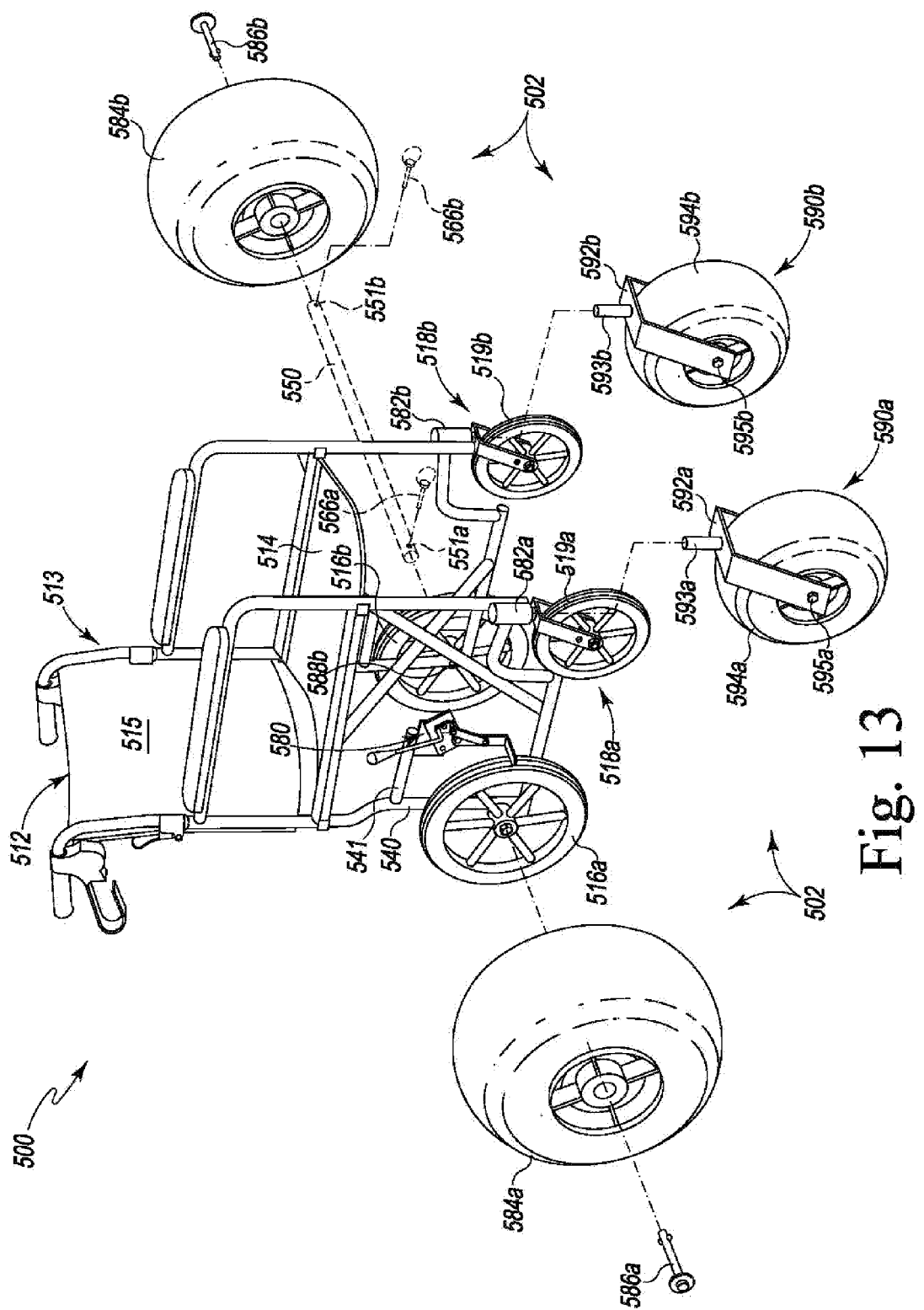
FIG. 13 is a perspective view of a folding wheelchair convertible between a folding conventional or street wheelchair and a folding specialty wheelchair, with specialty wheelchair components for converting the folding street wheelchair into a folding beach shown in exploded view relative to the folding street wheelchair.

Referring now to FIG. 13, there is depicted another embodiment of a folding portable convertible wheelchair, generally designated 500, that is convertible between a folding portable conventional or street wheelchair 512 and a folding portable specialty wheelchair, in accordance with the present principles, wherein the folding specialty wheelchair is a folding beach wheelchair. The folding street wheelchair 512 includes at least substantially the same features and parts as the street wheelchair of FIGS. 1 and 2 and, as such, has corresponding parts that are numbered in the 500's whose tens and digit places correspond to the corresponding part on the wheelchair 12 of FIGS. 1 and 2. These corresponding parts will not be discussed in detail.

The folding convertible wheelchair 500 includes specialty conversion components 502 (shown in exploded view) particularly for conversion between the folding street wheelchair 512 and a folding beach wheelchair, the folding beach wheelchair having a standard duty conversion version and a heavy duty conversion version. In this embodiment, the folding beach conversion components 502 utilize existing frame, supports, support structures, and/or attachment structures of the street wheelchair 512.

The conversion components 502 has a first front wheel assembly 590a and a second front wheel assembly 590b. The first front wheel assembly 590a is configured to replace the existing first front wheel assembly 518a while the second front wheel assembly 590b is configured to replace the existing second front wheel assembly 518b. Particularly, the first front wheel assembly 590a is configured for pivotal reception in the existing boss, pivot structure or support 582a of the frame 513. Likewise, the second front wheel assembly 590b is configured for pivotal reception in the existing boss, pivot structure or support 582b of the frame 513. As such, the first front wheel assembly 590a includes a robust yoke 592a extending about and rotatably supporting a low pressure tire 594a via an axle 595a, the low pressure tire 594a being smaller in diameter than the first rear tire 584a. A stem 593a extends from the yoke 592a that fits into the pivot bosses 582a. Likewise, the second front wheel assembly 590b includes a robust yoke 592b extending about and rotatably supporting a low pressure tire 594b via an axle 595b, the low pressure tire 594b being smaller in diameter than the second rear tire 584b. A stem 593b extends from the yoke 592b that fits into the pivot bosses 582b.

In the standard duty conversion version, the conversion components include a first rear large low pressure tire 584a and a second rear large low pressure tire 584b and corresponding quick release pins 586a, 586b. Quick release pins 586a and 586b may be Sky-Loc™ Button-Handle pins such as those manufactured by Big Sky Precision, Inc. of Manhattan, Mont. The first rear large low pressure tire 584a can be substituted for the existing first rear wheel 516a (the preferred mode) or may be installed adjacent to the existing first rear wheel 516a. In both cases, the quick release pin 586a attaches the first rear large low pressure tire 584a to the frame after the existing first rear wheel axle is removed. The second rear large low pressure tire 584b can also be substituted for the existing second rear wheel 516b (the preferred mode) or may be installed adjacent to the existing second rear wheel 516b. In both cases, the quick release pin 586b attaches the second rear large low pressure tire 584b to the frame after the existing second rear wheel axle is removed. Other manners or methods of providing quick release may be used such as thumb screws, wing nuts, knobs or the like.

In the heavy duty conversion version, the conversion components 502 do not utilize the quick release pins 586a, 586b to attach the first and second rear low pressure wheels 584a, 584b to the frame, but includes a rear axle 550 (shown in dashed line to represent an alternate conversion components version) that is supported through the existing axle bores of the frame 513 that support the first and second existing wheels 516a and 516b of the portable street wheelchair 512. The first rear large low pressure tire 584a is received over an end of the rear axle 550 that extends beyond the first rear wheel 516a in the case where the first rear wheel 516a remains on the wheelchair or extends beyond the rear frame where the wheelchair is sans the first rear wheel 516a. A pin 566a (shown in dashed line to represent an alternate conversion components version) extends through a bore 551a in the end of the axle 550. The second rear large low pressure tire 584b is received over an end of the rear axle 550 that extends beyond the second rear wheel 516b in the case where the second rear wheel 516b remains on the wheelchair or extends beyond the rear frame where the wheelchair is sans the second rear wheel 516b. A pin 566b (shown in dashed line to represent an alternate conversion components version) extends through a bore 551b in the end of the axle 550. Again, other manners or methods of providing quick release may be used such as thumb screws, wing nuts, knobs or the like.

According to an aspect of the present invention, the folding convertible wheelchair converts between one type of folding specialty wheelchair and another type of folding specialty wheelchair, rather than from a folding street wheelchair to a folding specialty wheelchair as previously taught. In the versions shown in FIGS. 1-8, 11 and 13, the folding specialty wheelchair is a folding beach wheelchair, with the versions shown in FIGS. 9-10, and 12, described below, the folding specialty wheelchair is a folding all-terrain or trail wheelchair. Thus, the folding beach wheelchair is convertible into the folding all-terrain wheelchair and vice versa using the various components and principles provided herein.

Figure 9:
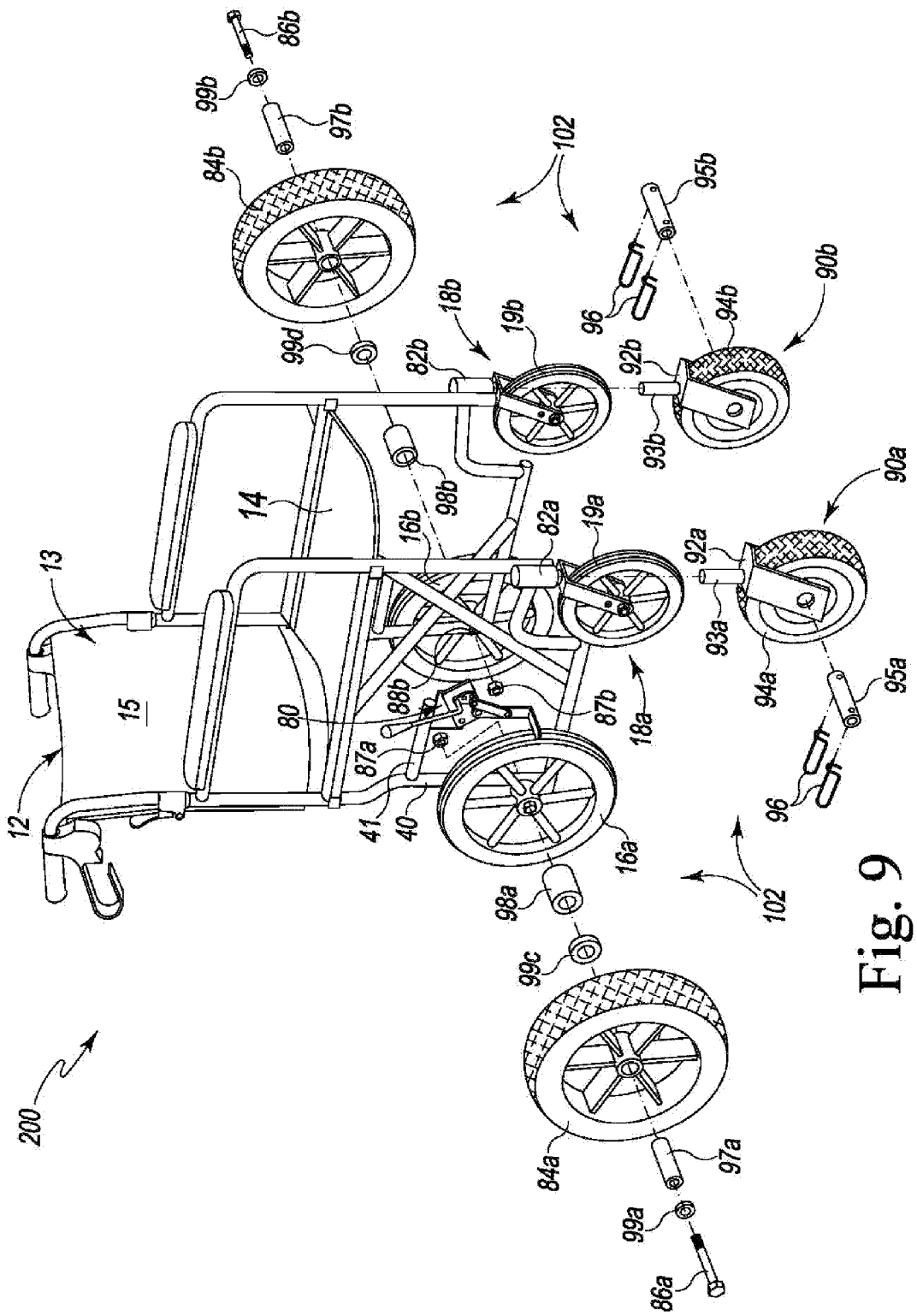
FIG. 9 is a perspective view of a folding portable wheelchair convertible between a folding conventional or street wheelchair and a folding specialty wheelchair, with specialty wheelchair components for converting the folding street wheelchair into a folding all-terrain wheelchair shown in exploded view relative to the folding street wheelchair.
Figure 10:
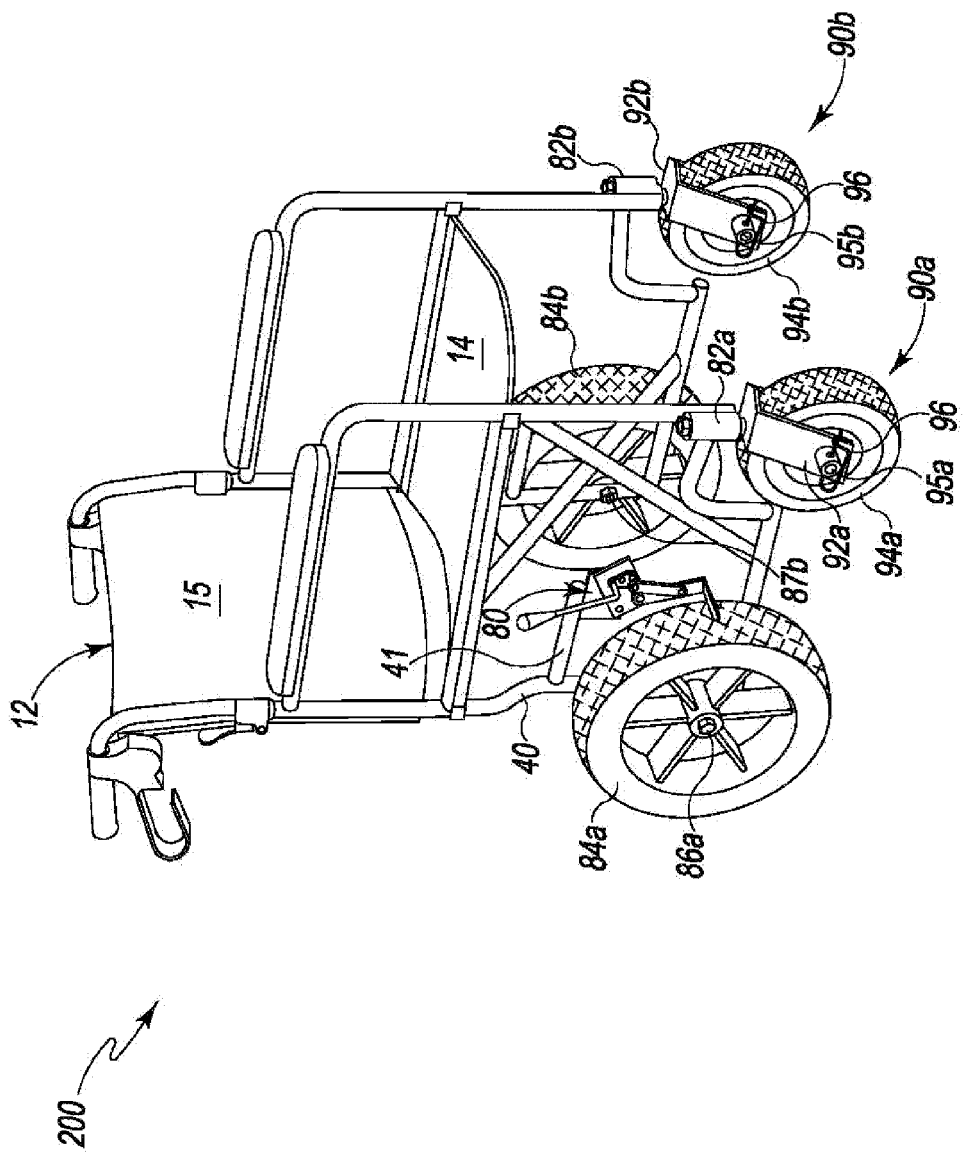
FIG. 10 is a perspective view of the folding wheelchair of FIG. 9 converted into a folding all-terrain wheelchair via the all-terrain conversion components.

Referring now to FIGS. 9 and 10, there is shown a folding convertible wheelchair, generally designated 200 fashioned in accordance with the present principles, that is convertible between a folding conventional or street wheelchair 12 (see FIG. 1) and a folding specialty wheelchair, which in this case, is a folding all-terrain or trail wheelchair 200 when specialty conversion components 102 are made part of and/or installed on the wheelchair 12. The wheelchair 12 has a folding lightweight frame 13. The frame 13 supports a seat 14 and a back 15, brake assembly 80, as well as armrests, user hand holds, hand brakes, and other typical wheelchair elements shown and not shown such as that described with respect to the wheelchair 12 of FIG. 1.

The folding all-terrain conversion components 102 include first and second rear tires 84a, 84b with associated first and second axle bolts 86a, 86b and nuts 87a, 87b, and first and second front wheel assemblies 90a, 90b. The first and second rear tires 84a, 84b can either be connected adjacent to or replace the first and second rear street wheels 16a, 16b and their associated axles/axle bolt and nuts. The rear all-terrain tires 84a, 84b have a wider tread than the first and second rear street wheels 16a, 16b and are more robust than the first and second street wheels 16a, 16b such as solid tires or high pressure tube or tubeless tires. In the case where the first and second rear tires 84a, 84b replace the first and second rear wheels 16a, 16b, the first and second rear tires 84a, 84b have a diameter that is greater than the diameter of the first and second rear wheels 16a, 16b. In both cases, the first rear tire 84a is coupled to a rear frame member via a first rear axle bolt 86a. The first rear axle bolt 86a extends through a washer 99a and a sleeve 97a that is received in the hub of the tire 84a. A tubular spacer 98a and washer 99c are provided between the inside of the tire 84a and the rear frame member or the existing first rear wheel 16a. The first rear axle bolt 86a likewise extends through these conversion components while a nut 87a is received on the threaded end of the bolt 86a that extends through the rear frame member. A wing nut, knob or other securing means may be used in place of the nut 87a.

Likewise, in both cases, the second rear tire 84b is coupled to a rear frame member via a second rear axle bolt 86b. The second rear axle bolt 86b extends through a washer 99b and a sleeve 97b that is received in the hub of the tire 84b. A tubular spacer 98b and washer 99d are provided between the inside of the tire 84b and the rear frame member or the existing second rear wheel 16a. The second rear axle bolt 86b likewise extends through these conversion components while a nut 87b is received on the threaded end of the bolt 86b that extends through the rear frame member. A wing nut, knob or other securing means may be used in place of the nut 87b.

The first and second front all-terrain wheel assemblies 90a, 90b of the conversion components 102 replace the first and second front street wheel assemblies 18a, 18b of the street wheelchair. The first and second front all-terrain wheel assemblies 90a, 90b each have a respective robust yoke 92a, 92b supporting a wider, more robust all-terrain or trail front tire 94a, 94b. A stem 93a, 93b extends from the respective yoke 92a, 92b that fits into the respective existing pivot bosses, supports or structures 82a, 82b of the frame 13, the pivot bosses being existing front wheel supports or structures. The first front all-terrain tire 94a is rotatably connected to the yoke 92a via a first front wheel assembly axle 95a. Clip pins 96, attachable to ends of the axle 95a that extend beyond arms of the yoke 92a, retain the first front tire 94a on the yoke 92a. Likewise, the second front all-terrain tire 94b is rotatably connected to the yoke 92*b* via a second front wheel assembly axle 95*b*. Clip pins 96, attachable to ends of the axle 95*b* that extend beyond arms of the yoke 92*b*, retain the second front tire 94*b* on the yoke 92*b*.

Figure 14:
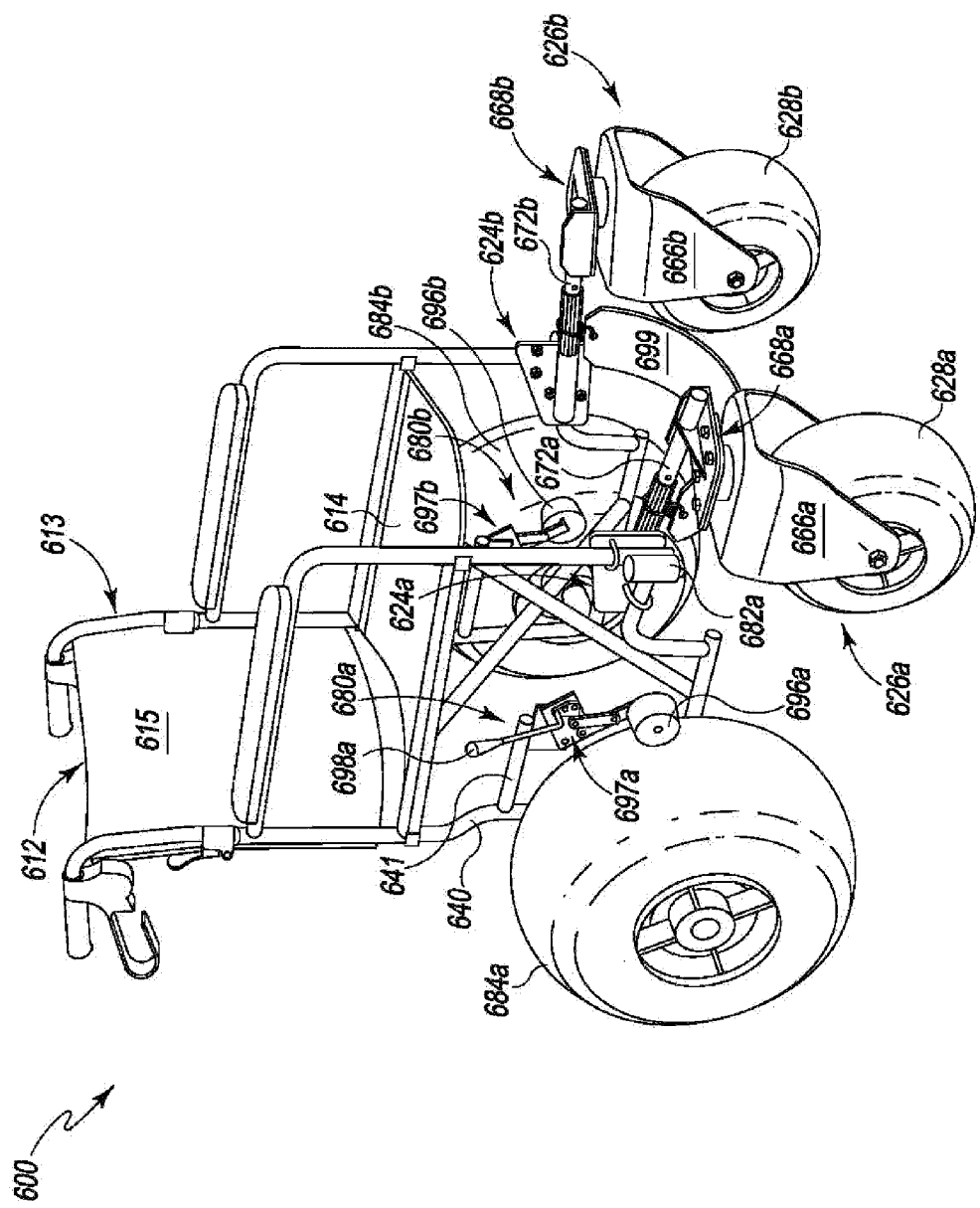
FIG. 14 is a perspective view of a folding beach wheelchair that may be a specialty wheelchair or a folding wheelchair convertible between a folding beach wheelchair and a folding all-terrain wheelchair, with wheelchair components for converting the folding all-terrain wheelchair into a folding beach wheelchair already mounted to the folding wheelchair frame.
Figure 15:
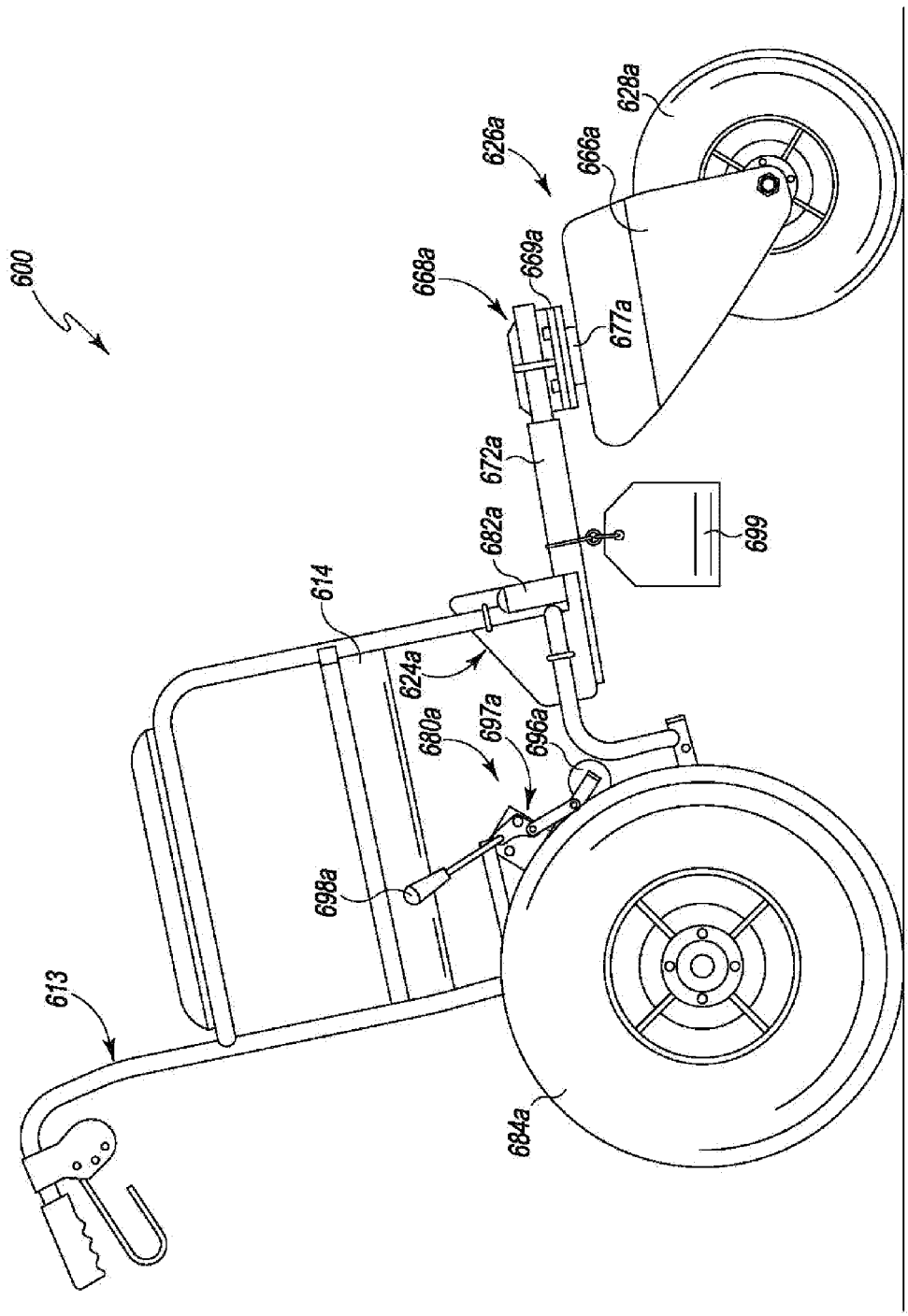
FIG. 15 is a side view of the folding beach wheelchair of FIG. 14.

During conversion from the folding street wheelchair 12 to the folding all-terrain wheelchair 200, the first and second rear street wheels 16*a*, 16*b* and their axles are removed and replaced with the present first and second rear all-terrain wheels 84*a*, 84*b* and axles 86*a*, 86*b* of the all-terrain conversion components 102. The first and second front wheel assemblies 18*a*, 18*b* are removed and replace with the present first and second front all-terrain wheel assemblies 90*a*, 90*b* of the all-terrain conversion components 102. Conversion from the folding all-terrain wheelchair 200 to the street wheelchair 12 is accomplished by replacing the first and second front wheel assemblies 90*a*, 90*b* with the first and second front wheel assemblies 18*a*, 18*b* and the first and second rear tires 84*a*, 84*b* with the first and second rear wheels 16*a*, 16*b*. It can be appreciated that the all-terrain conversion components 102 provide a folding all-terrain wheelchair from a folding street wheelchair that can easily navigate off-road terrain. The conversion components of the folding all-terrain wheelchair 200 are used in converting the folding all-terrain wheelchair 200 to a folding beach wheelchair 600 as shown in FIGS. 14 and 15 and vice versa, thus the folding all-terrain wheelchair is one type of folding specialty wheelchair and the folding beach wheelchair is a second type of folding specialty wheelchair.

Figure 12:
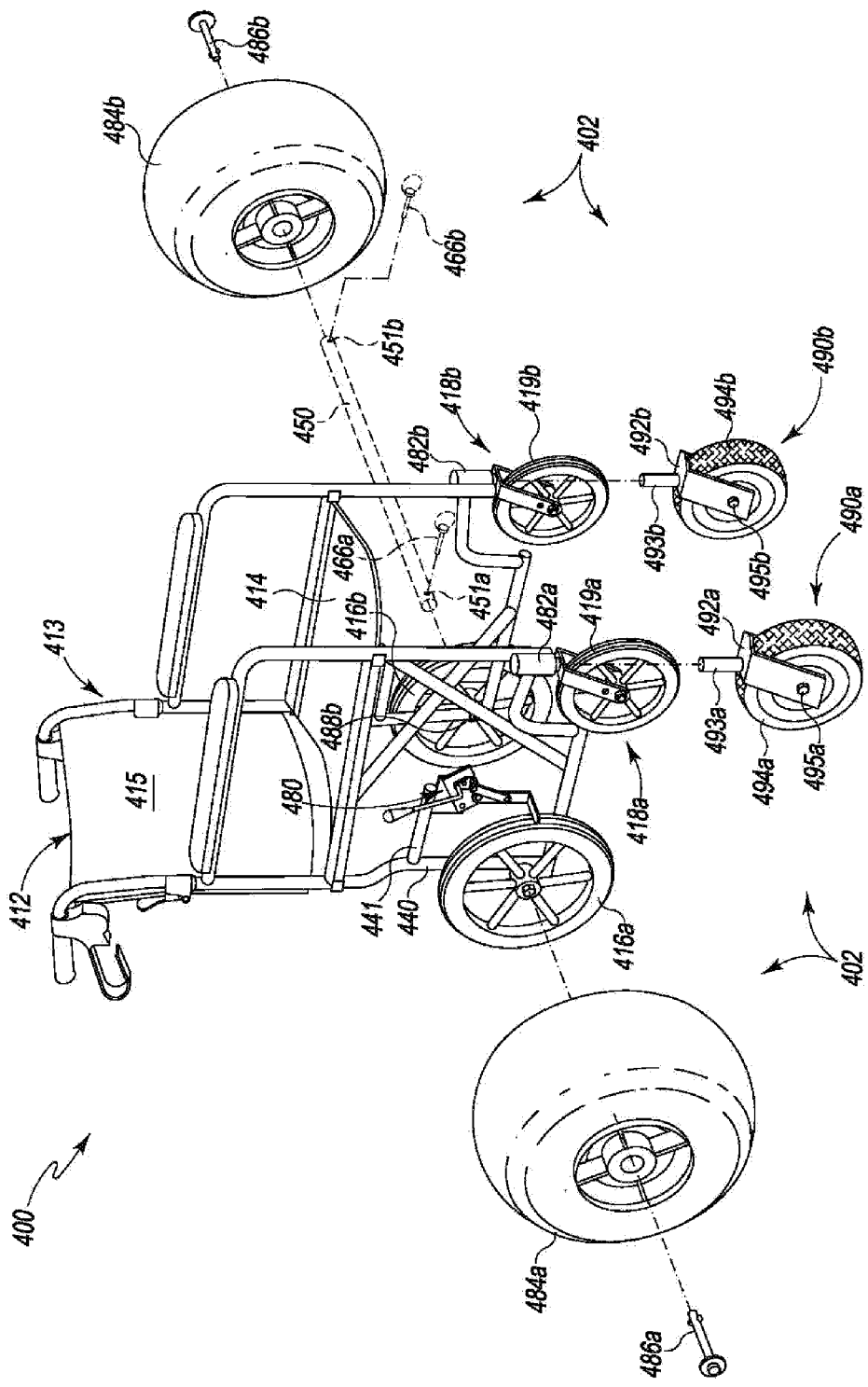
FIG. 12 is a perspective view of a folding wheelchair convertible between a folding conventional or street wheelchair and a folding specialty wheelchair, with specialty wheelchair components for converting the folding street wheelchair into a folding all-terrain or trail wheelchair shown in exploded view relative to the folding street wheelchair.

Referring now to FIG. 12, there is depicted another embodiment of a folding convertible wheelchair, generally designated 400, that is convertible between a folding conventional or street wheelchair 412 and a folding specialty wheelchair, in accordance with the present principles, wherein the folding specialty wheelchair is a folding all-terrain or trail wheelchair, the folding trail wheelchair having a standard duty conversion version and a heavy duty conversion version. The folding street wheelchair 412 includes at least substantially the same features and parts as the folding street wheelchair of FIGS. 1 and 2 and, as such, has corresponding parts that are numbered in the 400's whose tens and digit places correspond to the corresponding part on the wheelchair 12 of FIGS. 1 and 2. These corresponding parts will not be discussed in detail. The folding convertible wheelchair 400 includes specialty conversion components 402 (shown in exploded view) particularly for conversion between the folding street wheelchair 412 and a folding all-terrain, trail and/or beach wheelchair. In this embodiment, the conversion components 402 utilize existing frame, supports, support structures, and/or attachment structures of the folding street wheelchair 412.

The conversion components 402 include a first front wheel assembly 490*a* and a second front wheel assembly 490*b*. The first front wheel assembly 490*a* is configured to replace the existing first front wheel assembly 418*a* while the second front wheel assembly 490*b* is configured to replace the existing second front wheel assembly 418*b*. Particularly, the first front wheel assembly 490*a* is configured for pivotal reception in the existing boss, pivot structure or support 482*a* of the frame 413. Likewise, the second front wheel assembly 490*b* is configured for pivotal reception in the existing boss, pivot structure or support 482*b* of the frame 413. As such, the first front wheel assembly 490*a* includes a robust yoke 492*a* extending about and rotatably supporting an all-terrain or trail tire 494*a* via an axle 495*a*, the trail tire 494*a* being smaller in diameter than the first rear tire 484*a*. A stem 493*a* extends from the yoke 492*a* that fits into the pivot boss or support 482*a*. Likewise, the second front wheel assembly 490*b* includes a robust yoke 492*b* extending about and rotatably supporting an all-terrain or trail tire 494*b* via an axle 495*b*, the trail tire 494*b* being smaller in diameter than the second rear tire 484*b*. A stem 493*b* extends from the yoke 492*b* that fits into the pivot boss or support 482*b*. It can be appreciated that the folding all-terrain conversion components 102 provide a folding all-terrain wheelchair from a folding street wheelchair that can easily navigate off-road terrain.

In the standard duty conversion version, the conversion components include a first rear large low pressure tire 484*a* and a second rear large low pressure tire 484*b* and corresponding quick release pins 486*a*, 486*b*. Quick release pins 586*a* and 586*b* may be Sky-Loc™ Button-Handle pins such as those manufactured by Big Sky Precision, Inc. of Manhattan, Mont. The first rear large low pressure tire 484*a* can be substituted for the existing first rear wheel 416*a* (the preferred mode) or may be installed adjacent to the existing first rear wheel 416*a*. In both cases, the quick release pin 486*a* attaches the first rear large low pressure tire 484*a* to the frame after the existing first rear wheel axle is removed. The second rear large low pressure tire 484*b* can also be substituted for the existing second rear wheel 416*b* (the preferred mode) or may be installed adjacent to the existing second rear wheel 416*b*. In both cases, the quick release pin 486*b* attaches the second rear large low pressure tire 484*b* to the frame after the existing second rear wheel axle is removed. Other manners or methods of providing quick release may be used such as thumb screws, wing nuts, knobs or the like.

In the heavy duty conversion version, the conversion components 402 do not utilize the quick release pins 486*a*, 486*b* to attach the first and second rear low pressure wheels 484*a*, 484*b* to the frame, but includes a rear axle 450 (shown in dashed line to represent an alternate conversion components version). The rear axle 450 is supported through the existing axle bores of the frame 413 that support the first and second existing wheels 416*a* and 416*b* of the street wheelchair 412. The first rear large low pressure tire 484*a* is received over an end of the rear axle 450 that extends beyond the first rear wheel 416*a* in the case where the first rear wheel 416*a* remains on the wheelchair or extends beyond the rear frame where the wheelchair is sans the first rear wheel 416*a*. A pin 466*a* (shown in dashed line to represent an alternate conversion version) extends through a bore 451*a* at an end of the axle 450. The second rear large low pressure tire 484*b* is received over an end of the rear axle 450 that extends beyond the second rear wheel 416*b* in the case where the second rear wheel 416*b* remains on the wheelchair or extends beyond the rear frame where the wheelchair is sans the second rear wheel 416*b*. A pin 466*b* (shown in dashed line to represent an alternate conversion version) extends through a bore 451*b* at an end of the axle 450. The pins 466*a*, 466*b* are a quick release type pin such as described above. Other manners or methods of providing quick release may be used such as thumb screws, wing nuts, knobs or the like.

The various brackets, mounting structures and the like shown and described herein are exemplary of brackets, mounting structures and the like that may be used to provide conversion between the conventional wheelchair and the specialty wheelchair. Thus, variations and modifications to the brackets, mounting structures and the like are anticipated and contemplated. Likewise, the various hardware shown and described herein for attaching or mounting the various conversion components to the conventional wheelchair to make the specialty wheelchair are likewise exemplary of hardware that may be used to provide conversion between the conventional wheelchair and the specialty wheelchair. Thus, other types of hardware are anticipated and contemplated.

Other folding specialty wheelchairs may be provided by allowing attachment and/or replacement of components of the folding street wheelchair with other folding specialty wheelchair components. For instance, a water wheelchair may be provided by allowing attachment of oversized, floating "paddle" tires. Other variations are contemplated.

Referring now to FIGS. 14 and 15, there is depicted another embodiment of a folding convertible wheelchair, generally designated 600, that is 1) convertible between a folding conventional or street wheelchair and a folding specialty wheelchair 612, in accordance with the present principles, wherein the folding specialty wheelchair is a folding beach wheelchair, and/or 2) convertible between a folding specialty wheelchair of one type (i.e. a folding beach wheelchair 600) and a folding specialty wheelchair of another type (i.e. a folding all-terrain wheelchair 200). The beach wheelchair 600 includes at least substantially the same features and parts as the street/beach wheelchair of FIGS. 1 and 2 and, as such, has corresponding parts that are numbered in the 600's whose tens and digit places correspond to the corresponding part on the wheelchair 12 of FIGS. 1 and 2. These corresponding parts will not be discussed in detail. The embodiment depicted in FIGS. 14 and 15 also illustrates a dedicated beach wheelchair 612 that is created by pre-configuration using the conversion components described below. This provides a dedicated portable and folding beach wheelchair.

The folding convertible wheelchair 612 includes specialty conversion components particularly for conversion between the folding street wheelchair and/or folding all-terrain wheelchair and a folding beach wheelchair. In this embodiment, the folding beach conversion components utilize the existing folding frame 613, supports, support structures, and/or attachment structures of the wheelchair.

The conversion components include right and left rear wheels 684a, 684b comprising oversized, low-pressure tires such as the oversized, low pressure front right and left wheels/tires 32a, 32b of the wheelchair 20 of FIGS. 1 and 2 (or the rear right and left wheels/tires 584a, 584b of the wheelchair 500 of FIG. 13. The right and left rear wheels 684a, 684b are adapted to connect over or replace (with replacement shown in FIGS. 14 and 15) the existing street wheelchair wheels (not seen in FIGS. 14 and 15) such as described in connection with wheelchairs 20 and 500.

The converted folding beach wheelchair 600 includes right and left wheel stops 680a and 680b that are attached to right and left sides of the wheelchair frame 613 adjacent the right and left wheels 684a, 684b respectively. The right stop 680a is manually operated, typically, but not necessarily, by a user of the wheelchair, and includes linkage 697a bracketed to the frame 613 that operatively connects a handle 698a to a friction stop or pad 696a (e.g. a rubber stop). Manipulation of the handle 698a moves the linkage 697a to engage the stop 696a against the wheel 684a (a wheel lock position inhibiting rotation of the wheel) and disengage the stop 698a from being against the wheel 684a (a wheel unlock position allowing free rotation of the wheel). The left stop 680b is also manually operated, typically, but not necessarily, by a user of the wheelchair, and includes linkage 697b bracketed to the frame 613 that operatively connects a handle 698b to a friction stop or pad 696b (e.g. a rubber stop). Manipulation of the handle 698b moves the linkage 697b to engage the stop 696b against the wheel 684b (a wheel lock position inhibiting rotation of the wheel) and disengage the stop 698b from being against the wheel 684b (a wheel unlock position allowing free rotation of the wheel).

At least some of the specialty conversion components are preferably, but not necessarily, pre-mounted or installed on the wheelchair 612. For instance, a first or right front conversion bracket 624a is attached to right front frame members of the wheelchair proximate the wheelchair's original front wheel hub 682a via threaded U-bolts and nuts at a first front side of the frame 613 in like manner to the right rear bracket 24a of the wheelchair 20 of FIGS. 1 and 2, while a second or left front conversion bracket 624b is attached to left front frame members of the wheelchair proximate the wheelchair's original wheel hub 682b via threaded bolts and nuts at a second front side of the frame 513 in like manner to the left rear bracket 24b of the wheelchair 20 of FIGS. 1 and 2. For details regarding the brackets 624a, 624b, reference is made to the above description of brackets 24a, 24b.

The first front conversion bracket 624a supports a first front wheel conversion assembly 626a while the second front conversion bracket 624b supports a second front wheel conversion assembly 626b that together support the front end of the wheelchair such that the front end of the wheelchair 612 is elevated with respect to (e.g. is higher than) the rear end of the wheelchair 612 as best seen in FIG. 15. This backwards tilt allows the rider to sit more rearwardly in the seat 614 while the rider's legs are elevated. However, the conversion components may also be configured to provide a level and not tilted seating if desired. To hold the rider's legs up, a foot strap 699 is provided between the arms 672a, 672b of the first and second front wheel conversion assembly 626am 626b. The foot strap 699 is attached to the arms 672a, 672b so as to swing relative to the arms 672a, 672b. Foot stops (not shown) may be additionally, or alternately provided.

The first and second front wheel conversion assemblies 626a, 626b are preferably, but not necessarily, the same configuration as the rear wheel conversion assemblies 26a, 26b of the wheelchair 12 of FIG. 1. Consequently, the detailed description of the rear wheel conversion assemblies with regard to the wheelchair 12 is incorporated herein. The first front wheel conversion assembly 626a an oversized, low pressure tire 628a (smaller than the rear tires 684a, 684b of the wheelchair) mounted on an axle that is supported by a yoke 666a. A stem 677a is rotatably mounted to and extends vertically from the yoke 666a to a connection assembly 668a. The yoke 666a is thus attached to the stem 677a such that the yoke 666a and thus the tire 628a can swivel or rotate about the connection assembly 668a. The stem 677a is particularly connected to a lower plate 669a of the connection assembly 668a which, in turn, is connected to an upper plate 670a of the connection assembly 668a. The upper plate 670a supports an arm 672a. The arm 672a is received in a tube (not seen) of the conversion bracket 624a. While not seen, the arm 672a has a bore that aligns with a bore of the tube of the conversion bracket 624a and which receives a D-pin of the like when the arm 672a is inserted into the tube. The front rear wheel conversion assembly 626a is thus easily attachable then detachable from the bracket 624a. The second front wheel conversion assembly 626b is the same as the first front wheel conversion assembly 626a and thus the description with respect to the first front wheel conversion assembly 626a applies and is incorporated herein by reference. It can be appreciated that this conversion wheelchair, beach version 600 comfortably and securely holds a rider due to is tilt, large rear tires that do not pivot relative to the wheelchair frame, and front tires that do pivot with respect to the wheelchair frame. The wheelchair 600 is thus easily useable on all types and terrains and sands of various beaches. In another form, the front wheels may be fixed with respect to the wheelchair frame.

The various foldable beach wheelchairs shown and described herein are all convertible into the various foldable all-terrain wheelchairs shown and described herein via the various conversion components shown and described herein as well as the components of the embodiments as shown and described.

It should be appreciated that various mechanisms not particularly shown may be used for the various structures and or mechanisms shown herein. Thus, while the invention has been illustrated and described in detail in the drawings and foregoing description, the same is to be considered as illustrative and not restrictive in character, it being understood that only preferred embodiments have been shown and described and that all changes and/or modifications that come within the spirit of the invention are desired to be protected.

What is claimed is:

1. A collapsible wheelchair convertible between a collapsible beach wheelchair and a collapsible all-terrain wheelchair, comprising:
    a folding frame carrying a foldable seat, a foldable back, a right side frame structure, and a left side frame structure, the right side frame structure having a right side armrest, a right side back frame member, a right side front frame member, and a right side rear frame member, the left side frame structure having a left side armrest, a left side back frame member, a left side front frame member, and a left side rear frame member;
    a rear right side all-terrain tire of a first diameter rotatably mounted to the right side rear frame member and having a rear right side all-terrain tire axis of rotation;
    a rear left side all-terrain tire of the first diameter rotatably mounted to the left side rear frame member, and having a rear left side all-terrain tire axis of rotation that is co-axial with the rear right side all-terrain tire axis of rotation and which together define a rear all-terrain axis of rotation whose height from ground is substantially equal to a radius of the first diameter;
    a front right side all-terrain tire of a second diameter that is less than the first diameter mounted to the right side front frame member and having a front right side all-terrain tire axis of rotation;
    a front left side all-terrain tire of the second diameter rotatably mounted to the left side front frame member, and having a front left side all-terrain tire axis of rotation that is co-axial with the front right side all-terrain tire axis of rotation and which together define a front all-terrain axis of rotation whose height from ground is substantially equal to a radius of the second diameter, whereby the foldable seat is substantially parallel to ground when the folding frame in un-folded; and
    conversion components that, when installed on the folding frame with the front and rear all-terrain tires, convert the all-terrain wheelchair into a beach wheelchair, the conversion components including:
    a rear axle sized to be received through the rear right side all-terrain tire axis of rotation of the rear right side all-terrain tire and the rear left side all-terrain tire axis of rotation of the rear left side all-terrain tire, the rear axle defining a rear beach axis of rotation;
    a rear right side beach tire of a third diameter rotatably mountable on the rear axle;
    a rear left side beach tire of the third diameter rotatably mountable on the rear axle, the rear beach axis of rotation having a height from ground that is substantially equal to a radius of the third diameter;
    a pivoting front right side beach tire of a fourth diameter that is less that the third diameter receivable in place of the front right side all-terrain tire; and
    a pivoting front left side beach tire of the fourth diameter receivable in place of the front left side all-terrain tire;
    the third diameter of the right and left rear beach tires relative to the fourth diameter of the right and left front beach tires making the foldable seat slant upwardly relative to ground from the rear of the folding frame to the front of the folding frame when the folding frame in un-folded.

2. The collapsible wheelchair of claim 1, wherein each beach tire comprises a low pressure tire.

3. The collapsible wheelchair of claim 1, wherein the right and left front beach tires comprise wheel assemblies each having a low pressure tire retained by a yoke pivotally coupled to a plate.

4. The collapsible wheelchair of claim 1, further comprising a foot strap attached between the right side front frame member and the left side front frame member.

5. The collapsible wheelchair of claim 4, wherein the foot strap has a first end that is pivotally attached to the right side front frame member, and a second end that is pivotally attached to left side front frame member.

6. The collapsible wheelchair of claim 1, further comprising:
    a first stop mechanism mounted on the right side frame structure and having a right side rubber member that is configured to selectively engage with and disengage from the rear right side all-terrain tire upon user actuation; and
    a second stop mechanism mounted on the left side frame structure and having a left side rubber member that is configured to selectively engage with and disengage from the rear left side all-terrain tire upon user actuation.

* * * * *